United States Patent [19]

Schult et al.

[11] Patent Number: 4,861,060
[45] Date of Patent: Aug. 29, 1989

[54] AIR SUSPENSION APPARATUS

[75] Inventors: Leslie H. Schult, Eagan; Charles J. Tekautz, Jr., Tower, both of Minn.

[73] Assignee: Tartan Transportation Systems, Inc., Edina, Minn.

[21] Appl. No.: 104,828

[22] Filed: Oct. 2, 1987

[51] Int. Cl.$^4$ .............................................. B62D 53/08
[52] U.S. Cl. .............................. 280/439; 254/93 HP; 267/64.27; 267/64.28; 267/122; 280/440
[58] Field of Search ................... 280/433, 438 R, 439, 280/440; 267/64.27, 64.28, 122; 254/93 H, 93 R, 93 VA, 93 HP

[56] References Cited

U.S. PATENT DOCUMENTS

| | | | |
|---|---|---|---|
| 2,821,409 | 1/1958 | Chalmers | 280/440 |
| 2,968,496 | 1/1961 | Gouirand | 280/439 |
| 3,233,886 | 2/1966 | Saffell et al. | 267/122 |
| 4,279,430 | 7/1981 | Tagg et al. | 280/439 |

FOREIGN PATENT DOCUMENTS

| | | | |
|---|---|---|---|
| 1193008 | 4/1959 | France | 280/440 |
| 1324996 | 3/1963 | France | 280/440 |
| 235279 | 10/1986 | Japan | 280/439 |
| 2023231 | 12/1979 | United Kingdom | 254/93 HP |

Primary Examiner—Mitchell J. Hill
Attorney, Agent, or Firm—Merchant, Gould, Smith, Edell, Welter & Schmidt

[57] ABSTRACT

An air suspension apparatus is disclosed for use with the fifth wheel connection between a tractor and semitrailer. The apparatus includes upper and lower frame sections that are connected by a hinge mechanism for relative pivotal movement. An inflatable air bag is operably disposed between the upper and lower frame sections, having a low ratio of effective surface area to internal volume and hence a very low profile. An air reservoir defined by tubular framework surrounds the air bag and has an internal volume approximating that of the air bag. The air bag and reservoir are connected by an air line with a very small cross sectional area as compared to the surface area of the air bag. The reservoir and interconnecting air line effectively damp vibrational energy in the air bag as the tractor and semitrailer move over the highway.

13 Claims, 3 Drawing Sheets

AIR SUSPENSION APPARATUS

The invention broadly relates to air suspension systems for larger masses, and is specifically directed to an air suspension system to reduce the vibrational forces and shock transmitted through the fifth wheel connection between a tractor and semitrailer.

Fifth wheel suspension systems are not novel, and a variety of approaches to the problem of excessive vibration and shock appear in the prior art. The inventive unit improves on these prior art approaches in several respects.

The primary problems addressed with fifth wheel suspension systems are driver fatigue and damage to the load, both of which are the consequence of incessant vibrational and shock forces encountered as the tractor and semitrailer move over the road. These problems are amplified by the large size of the hauling and hauled vehicles, the load mass, extreme distances traveled in over-the-road hauling, and the condition of the highways over which the load is hauled.

Air bags have been employed in prior art fifth wheel suspension apparatus because they effectively act as a spring, thus absorbing a portion of the vibrational and shock forces and diminishing the magnitude of such forces transmitted from the semitrailer to the tractor and vice versa.

Of course, virtually all springs including air bags oscillate or vibrate as the result of such forces, and if the resulting system vibration is not dealt with it can create problems as severe as the direct imposition of road forces on the tractor and semitrailer. Consequently, many if not most fifth wheel suspension apparatus employ conventional shock absorbers (e.g., restricted flow piston-cylinder devices) to dampen vibrations. An alternate approach in the prior art has been to connect the air bag through an air hose or line to a reservoir, which performs a vibration damping function.

In designing fifth wheel suspension systems, a number of factors must be taken into consideration. For example, the air bag must be sized to handle the massive loads that semitrailers carry, which can be well in excess of 30,000 pounds.

Further, the range of frequency of vibration from the road, which is input to the suspension system, must be factored into selection or design of the air bag and other components. This input frequency of road vibration is typically 4 Hz. and higher. The natural or inherent frequency of the entire suspension system (including the air bag, damping devices and load) cannot fall within this vibrational frequency or resonance may occur, which substantially increases the magnitude of vibrational energy and creates a dangerous operational environment. Consequently, such suspension systems are generally designed to have a natural frequency that is less than the frequency of input road vibrations. The natural frequency of the system can be reduced through the proper design of vibration damping devices.

In this regard, the rate of vibration of the air bag itself is a function of its size (surface area and volume), pressure within the bag (which is dependent on the size of the load) and the amount of deflection of the bag during operation. If there is considerable deflection and hence a significant change of volume of the air bag, the pressure within the bag increases rapidly, which also increases the spring rate to the detriment of the system. Consequently, the air bag must be properly selected or designed so that the resultant natural frequency of the system is lower than and does not approach the frequency of input road vibrations (i.e., 4 Hz.).

Conventionally, this has been accomplished with large air bags having a substantial operating volume (e.g., 650 cubic inches). In such prior art devices, the effective surface of the air bag (i.e., the area which supports the load) is such that the ratio of operating volume to effective surface area is 2-4. Such air bags of necessity are relatively tall.

As discussed above, damping can be achieved with such air bags through the use of conventional shock absorbers, or by connecting the air bag to a reservoir through an air hose or line. While either can operate successfully, both have distinct disadvantages. For example, conventional shock absorbers increase the cost of the device and limit design flexibility because of space needs.

The reservoir approach has conventionally involved reservoir volumes that are large compared to the air bag volume (e.g., two to five times as great). Further, the recommended hose or tubing size for such systems is no less than ¾ inches in diameter, since smaller hoses have been believed to excessively throttle the passage of air between the bag and reservoir, which effectively increases the spring rate to the detriment of the overall system.

As such, prior art fifth wheel suspension systems have employed large air bags and larger reservoirs interconnected by a relatively large hose or tube, all of which must be accommodated from the standpoint of limited space availability on the tractor and semitrailer.

The inventive apparatus is the result of our endeavor to improve existing air suspension systems. First, we have discovered that, contrary to conventional knowledge, it is possible to effectively absorb vibrational forces and shock with a fifth wheel suspension apparatus that employs an air bag having a large surface area but having a volume that is much smaller than prior art devices, and having a ratio of operating volume to effective surface area of no more than about 1. In the preferred embodiment, we employ an air bag having an effective surface area of approximately 400 square inches based on a square configuration with 20 inches per side. In its deflated state, the air bag has a thickness of approximately ¾ inch, and fully expanded its overall height is on the order of 1½ inches. Its normal operating volume is 200 cubic inches, which is based on a normal external operating height of 1¼ inches and internal chamber height of ½ inch. As such, the ratio of normal operating volume to effective surface area is 0.5, and the ratio increases only to 0.75 in the fully inflated state. This air bag is very low in profile relative to prior art devices, and is much more easily accommodated into the fifth wheel suspension apparatus, whether mounted on the tractor or the semitrailer. Further, because of its low profile, deflection of the air bag is held to a minimum, which maintains a relatively low natural frequency of vibration.

We have also discovered that in conjunction with such a low volume and low profile air bag, an air hose or tube connection much smaller than prior art devices may be used. As stated above, prior art devices have employed a ¾ inch hose (outside diameter), and it has been heretofore believed that air suspension apparatus of this type could not use air hoses that are lesser in size because they would throttle the air flow between the air bag and reservoir, thus increasing the spring rate and hence natural frequency of the system. Contrary to conventional knowledge as incorporated in prior art devices, we have found that a hose or tube having an outside diameter as small as ¼ inch will operate entirely successfully between the low profile air bag and its reservoir, damping vibrations in the air bag and effectively reducing the natural frequency of the entire suspension system to on the order of 2 Hz.

In this regard, it is useful to relate the effective area of the air bag to the cross sectional size of the interconnecting hose. In prior art systems having an interconnecting hose with a ¾ inch minimum outside diameter, the ratio runs from approximately 40–2,250, with numbers at the lower end of this range and below recommended. Contrary to this conventional knowledge, the invention contemplates a ratio of at least about 5,000, with the ratio for the preferred embodiment on the order of 14,000.

With the use of a low-profile, low-volume air bag and interconnecting hose of small diameter, it has also been found that the size of the reservoir may be substantially reduced as compared with prior art devices. In the preferred embodiment, the volume of the reservoir is approximately the same as that of the air bag (it is greater than the operating volume but less than the fully expanded volume of the air bag). This enables the reservoir to be incorporated into the framework of the air suspension apparatus which surrounds the air bag, which totally obviates the need for reservoir space.

The features and advantages of the inventive air suspension apparatus are many. The most obvious advantage is significantly decreased size of the apparatus, which as a consequence occupies significantly less space and is considerably lighter in weight. Further, the smaller unit is much easier to install on new equipment or in retrofitting onto existing equipment. Because of its reduced size, it may also become portable in the sense that the apparatus may be detachably mounted.

Further features and advantages will become apparent from the specification and drawings.

Figure 1:
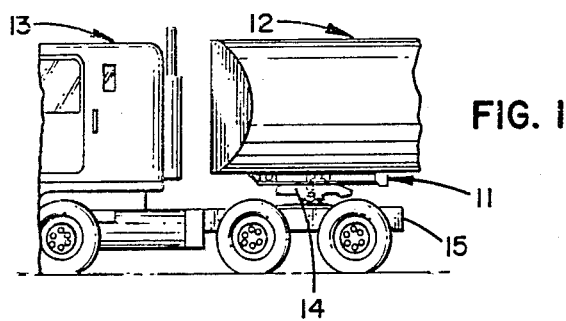
FIG. 1 is a fragmentary view in side elevation of a tractor and semitailer (tanker) interconnected through the use of the inventive air suspension apparatus.
Figure 2:
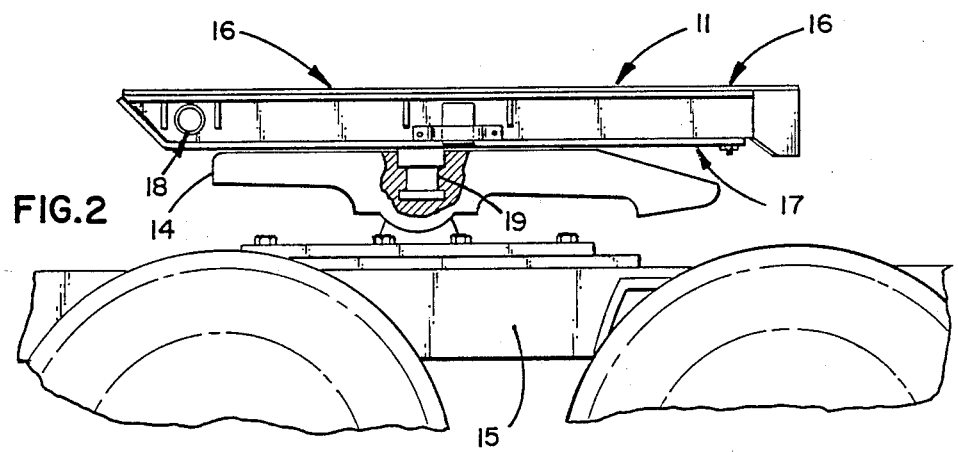
FIG. 2 is an enlarged fragmentary view in side elevation of the inventive apparatus connected to the fifth wheel of a tractor, with portions thereof being broken away and shown in section.

With initial reference to FIGS. 1 and 2, air suspension apparatus embodying the invention is represented generally by the numeral 11. In the preferred embodiment, apparatus 11 is mounted to a tanker (semitrailer) 12 for detachable connection to a tractor 13 through a fifth wheel 14 that is mounted to the tractor frame 15.

With reference to FIGS. 2–5, air suspension apparatus 11 broadly comprises an upper frame section 16 and a lower frame section 17 that are connected for relatively movement by means such as a pivot hinge mechanism 18. In the preferred embodiment, the upper section 16 is rigidly mounted to the bottom of the tanker 12 by any suitable conventional means, and the lower section 17 is detachably connected to the fifth wheel 14 by conventional means such as a king pin 19. The invention may be embodied suspension apparatus that is mounted to the frame of the tractor 13 and is detachably connected to a semitrailer or tanker.

Figure 3:
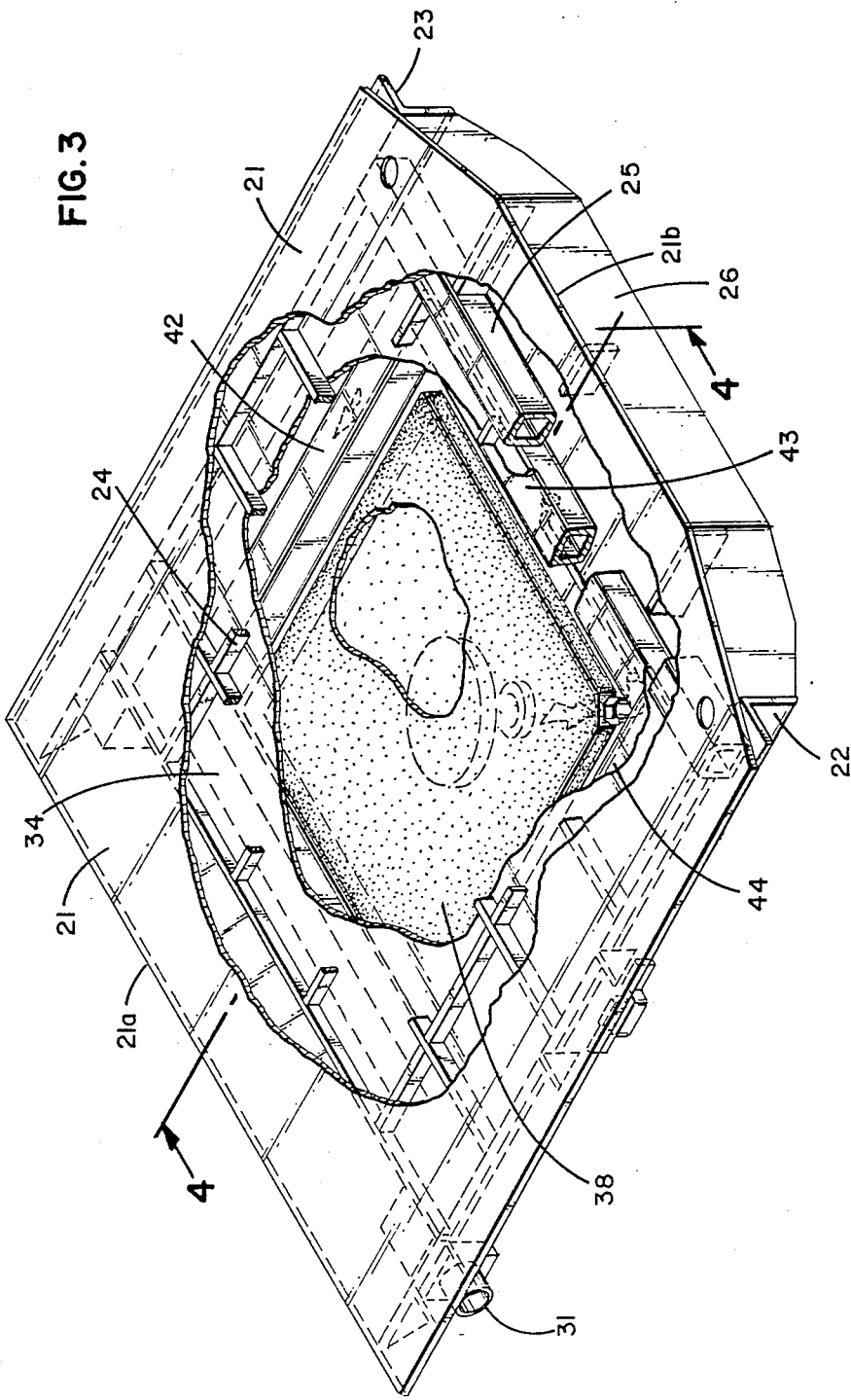
FIG. 3 is an enlarged perspective view of the inventive air suspension apparatus with portions thereof broken away and shown in section.
Figures 4, 5:
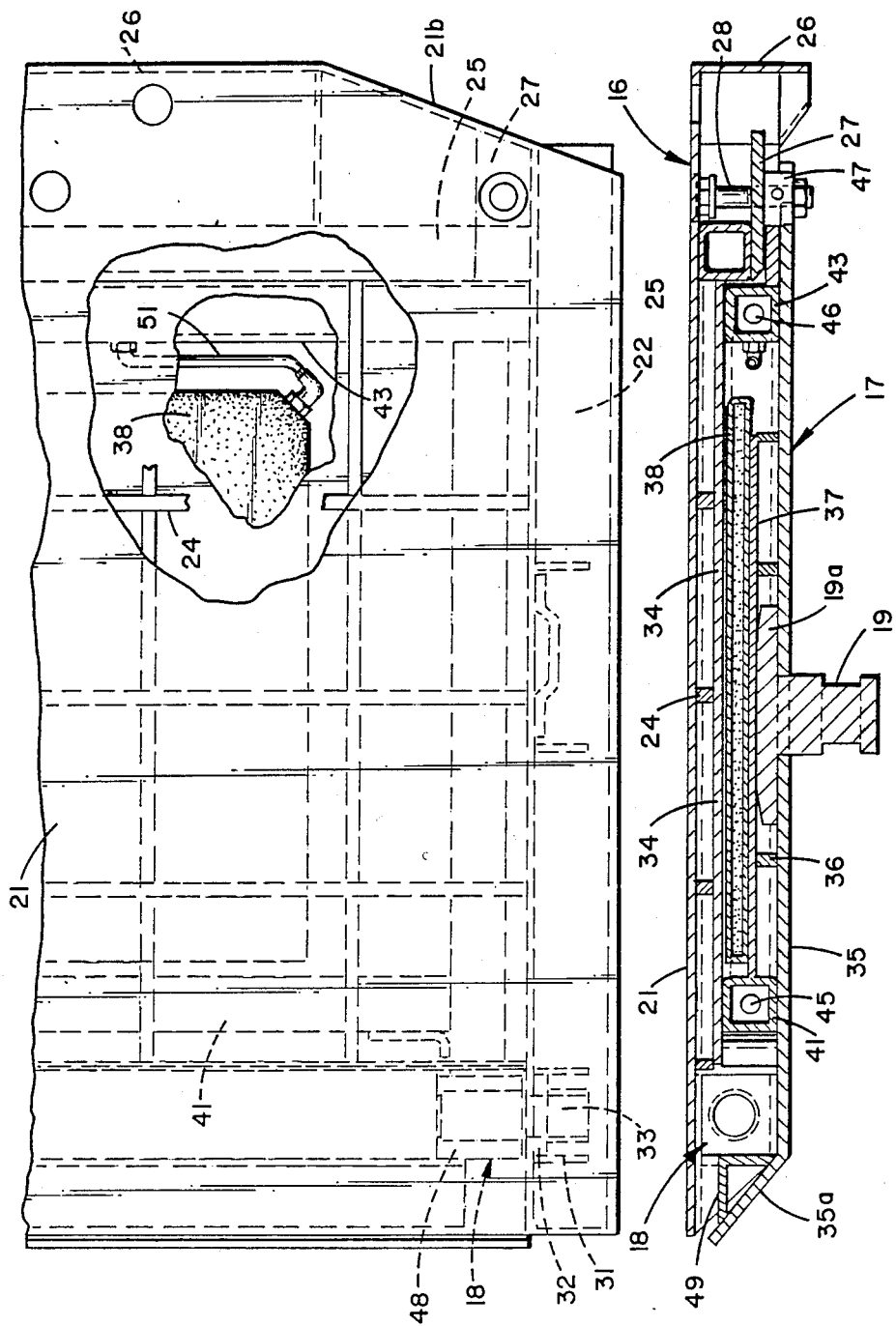
FIG. 4 is a sectional view in side elevation of the inventive air suspension apparatus taken along the line 4—4 of FIG. 3.
FIG. 5 is a further enlarged fragmentary sectional view in top plan of the inventive air suspension apparatus with portions thereof broken away and shown in section.

Upper section 16 comprises a generally rectangular, flat top plate 21 that is mounted directly to the tanker 12. As best shown in FIGS. 3 and 5, L-shaped beams 22, 23 are secured to the underside of top plate 21 along each side and extend over its length. A reinforcing gridwork 24 is also secured to the underside of top plate 21, extending laterally between the beams 22, 23, and having a longitudinal dimension that is somewhat less than the overall length of the top plate 21. A square tube 25 is secured to the rear edge of gridwork 24 as well as to the undersurface of top plate 21. Square tube 25 extends between and is secured to the beams 22, 23.

As best shown in FIGS. 3 and 5, the top plate 21 has a straight front edge 21a. The rear edge, which bears the reference numeral 21b, includes a central portion that is parallel to the edge 21a and outboard portions that are angled slightly. Extending downwardly from the rear edge 21b is a rear plate 26 that also includes a central parallel portion and angled outboard portions. The outboard ends of the rear plate 26 are respectively secured to the beams 22, 23.

With reference to FIGS. 4 and 5, stop members 27 are secured to the underside of square tube 25 at each end thereof, extending rearwardly in spaced relation to the top plate 21. The outboard edge of each stop member is secured to the associated L-shaped beam 22, 23, and its rear edge is secured to the angled outboard portion of the rear plate 26. Each of the stop members 27 is formed with a central aperture through which a limit bolt 28 moves as described in further detail below.

With continued reference to FIGS. 3 and 5, a hinge mechanism 18 is disposed at the forward end of the apparatus 11 at each side. Each hinge mechanism 18 consists of portions respectively associated with the upper and lower sections 16, 17. The portion of hinge mechanism 18 associated with the upper section 16 consists of a tube member 31 carried by a small square plate 32 that is in turn secured to the associated L-shaped beam 22, 23. A hinge pin 33 is disposed in the tube member 31, extending laterally inward through the associated L-shaped beam 22, 23 for operative engagement with the portion of hinge mechanism 18 that is associated with the lower section 17, as described below. Hinge pin 33 is retained in tube member 31 by a cross pin (not shown) that extends through both members.

With reference to FIG. 4, a flat, generally rectangular plate 34 is secured to the underside of reinforcing gridwork 24. Its rear edge abuts and is secured to the square tube 25, and its front edge extends forwardly to the hinge mechanism 18. Its side edges are respectively secured to the L-shaped beams 22, 23.

With continued reference to FIG. 4, lower section 17 consists of a lower plate 35 the width of which is slightly less than the distance between L-shaped beams 22, 23 to permit its hinged movement up and down therebetween. The rear edge of lower plate 35 extends rearwardly of the square tube 25 to underlie the two stop members 27. The forward edge of plate 35 is angularly upturned as shown at 35a, converging with but spaced from the top plate 21.

A rectangular reinforcing gridwork 36 is secured to the upper surface of lower plate 35. Lower gridwork 36 is smaller in size than the upper gridwork 24 both in length and width. A rectangular flat plate 37 is secured to the top surface of lower gridwork 36 in spaced relation to the rectangular flat plate 34, defining a shallow rectangular chamber therebetween. An air bag 38 is disposed in the shallow chamber, the structure and operation of which is described in further detail below.

With reference to FIGS. 3-5, four square tubular members 41-44 are interconnected in rectangular fashion and surround the air bag 38. All four of the tubular members 41-44 are secured to the upper surface of lower plate 35. Tubular member 41 extends crosswise along the leading edge of the air bag 38 and tubular member 43 also extends crosswise along its rear edge. Tubular members 42, 44 extend along each side of the air bag 38. Tubular members 41-44 are secured together in abutting relation, and as shown in FIG. 4, apertures such as those shown at 45, 46, are formed at each interconnecting point to define a closed chamber surrounding the air bag 38 that serves as a reservoir the purpose and function of which are described in further detail below.

With reference to FIG. 4, the king pin 19 is secured to the lower section 17. It includes a flat head 19a that is disposed within the gridwork 36 and between the plates 35, 37. The fifth wheel engaging portion of king pin 19 projects downwardly through the lower plate 35 externally of the apparatus 11.

With continued reference to FIGS. 4 and 5, each limit bolt 28 is carried by a block member 47 disposed along the lower edge of lower plate 35 in underlying relation to the associated stop member 27. As the lower section 17 moves relative to the upper section 16, the limit bolt 28 moves up and down relative to its associated stop member. The head of limit bolt 28 is larger than the aperture formed in the associated stop member 27, defining the lower limit point of movement of the lower section 17.

With reference to FIGS. 3 and 5, that portion of hinge mechanism 18 that is associated with the lower section 17 consists of a hinge block secured to the top surface of lower plate 35 inboard of the associated L-shaped beam 22, 23. An L-shaped beam 49 extends crosswise along the leading edge of lower plate 35, and is secured to both of the hinge blocks 48 as well as to the inner surface of the upturned leading edge 35a in a reinforcing manner.

Each of the hinge blocks 48 includes a plastic bushing that rotatably receives the hinge pin 33 for low frictional movement.

With reference to FIGS. 3-6, the air bag 38 is of conventional construction insofar that wall construction and overall strength are concerned. However, air bag 38 is unique in fifth wheel suspension apparatus because of its extremely low profile. In the preferred embodiment, air bag 38 is of square configuration, and the model shown has sides which are approximately 20 inches in length. As such, its external effective surface area is approximately 400 square inches.

In its deflated state, air bag 38 has a thickness of approximately ¾ inch. Fully inflated, its height or thickness is approximately 1¹ĸ inches. In its normal operating state, as shown in FIG. 4, its overall height is on the order of 1¼ inches (i.e., its internal inflated height is approximately ½ inch) and its normal operating volume is approximately 200 cubic inches.

In its fully inflated state, the ratio of the internal volume to effective surface area is on the order of 0.75, and this same ratio in the normal operating state is on the order of 0.5. On the belief that much greater volumes are necessary for the natural frequency of the air bag to be at a low level, prior art devices have utilized air bags having a ratio of internal volume to effective surface area of no less than two and as great as four. In other words, the aspect ratio is such that the air bag is relatively tall in its inflated operating state. Contrary to conventional belief, the ratio of internal volume to effective surface area of the air bag 38 should be no greater than about 1 in the fully inflated state, and is preferably on the order of 0.5 with the air bag 38 in its normal operating state.

The closed internal chamber of the square tubular members 41-44 serves as an air reservoir for the air bag 38, with an air connection therebetween as described in further detail below. Based on the length and internal dimensions of the tubular members 41-44, the reservoir volume approximates that of the air bag 38. More specifically, in the preferred embodiment, the internal volume of the reservoir defined by tubular members 41-44 is approximately 260 cubic inches, which is slightly more than the volume of air bag 38 in its normal operating state (approximately 200 cubic inches) but less than the volume in its fully inflated state (approximately 300 cubic inches). In prior art devices, conventional knowledge has determined that the volume of the reservoir must be much larger than that of the air bag (e.g., on the order of two to five times as great) in order for a significant reduction of spring rate to occur to reduce the natural frequency of the suspension system. The inventive apparatus 11 permits the reservoir volume to approximate that of the air bag, which substantially reduces the reservoir size. The inventive apparatus 11 takes advantage of this significantly reduced reservoir size, enabling the reservoir to be part of the standard framework for the apparatus, entirely obviating the need for an external reservoir and avoid the problem of coping with its space requirements.

Figure 6:
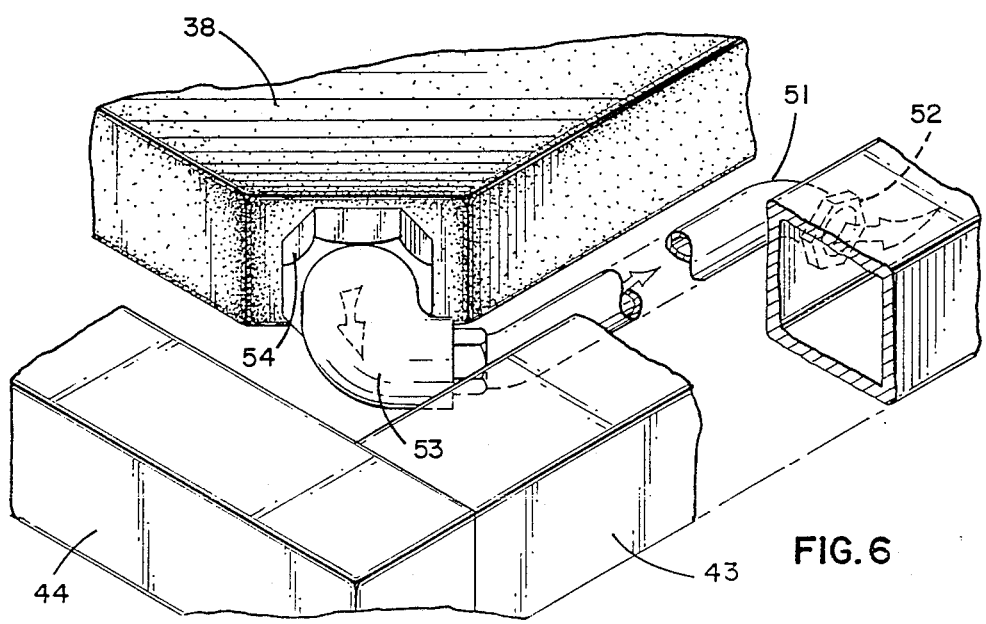
FIG. 6 is a further enlarged fragmentary perspective view of the inventive air spring apparatus with portions thereof being broken away and shown in section.

With primary reference to FIG. 6 and additional reference to FIGS. 3-5, air bag 38 is connected to tubular frame member 43, and hence to the reservoir, through an air hose or line 51. At the reservoir side, a coupling 52 interconnects the air line 51 with the tubular member 43, and on the opposite end the air line 51 is connected through an elbow 53 and coupling 54 to the air bag 38.

In the preferred embodiment, the air line 51 has an outside diameter of ¼ inch and an internal diameter of 3/16 inch. This is significantly smaller than prior art devices, which have utilized air lines of no less than ¾ inch on the theory that smaller interconnecting lines excessively throttle the passage of air between the air bag and reservoir, which effectively increases the spring rate and causes the air bag to have a higher natural frequency of vibration.

A more meaningful comparison of the size of air line 51 relative to the prior art may be appreciated by considering the effective area of air bag 38 to the cross sectional size of the air line 51, and comparing this ratio with the ratios of known prior art devices. The ratios of such known prior art devices run from approximately 40–2,250, with a clear preference for numbers at the low end of the scale and even less. In striking contrast, the inventive apparatus 11 should have a ratio of air bag effective area to air line cross sectional size of at least twice as much as the highest number for such prior art devices; i.e., at least about 5,000. In the preferred embodiment, the ratio is 14,000 and increases to approximately 20,000 when the restrictive couplings 52, 54 are taken into consideration.

Air is introduced into the system through a conventional air leveling valve (not shown) that automatically maintains proper inflating of the air bag 38.

Use of the inventive apparatus 11, as incorporating the extremely low profile air bag 38 and reservoir of approximately the same volume interconnected by the air line 51 of small cross sectional size, has been shown to effectively absorb vibrational energy input to the tractor and semitrailer from over-the-road travel. Further, the reservoir and interconnecting air line serve to damp vibrations within the air bag 38 and reduce the natural frequency of the overall suspension system to a point below the frequency of vibrational energy input from travel over the road, which effectively diminishes driver fatigue and reduces the likelihood of damage to the load.

The phenomena of operation of the inventive apparatus are not fully understood, but the practical consequences result in a number of features and benefits. First, the substantially reduced operating height of the air bag permits the size of the overall apparatus to be reduced significantly. The overall height of the apparatus is much thinner than prior art devices, and overall weight is reduced by more than ½ relative to many prior art devices. Because of its reduced size and weight, the inventive air suspension apparatus is much easier to install on new equipment or in retrofitting onto existing equipment. The fact that the reservoir is incorporated into the suspension apparatus itself obviously means that no provision need be made for mounting a separate reservoir at a remote location on the tractor or semitrailer. Further, the use of a single low-profile air bag, which advantageously is of a square configuration, avoids balancing problems and sway that can occur with prior art devices. Last, the reduced size of the apparatus enable it to be designed for mounting on a semitrailer or tanker, as shown in the preferred embodiment, but also on the tractor itself. In either case, the unit occupies significantly less space than prior art devices.

What is claimed is:

1. Air suspension apparatus for the fifth wheel connection between a tractor and semitrailer, comprising:
   upper and lower frame sections;
   first means for mounting one of said upper and lower frame sections to one of said tractor and semitrailer;
   second means for removably connecting the other of said upper and lower frame sections to the other of said tractor and semitrailer;
   third means for operably connecting the upper and lower frame sections for relative movement;
   and inflatable air bag means disposed between the upper and lower frame sections to absorb portions of forces transmitted therebetween, the air bag means having a predetermined external effective surface area and a predetermined internal volume with the ratio of internal volume to effective surface area of no more than about 1 with the air bag means in its fully inflated state.

2. The apparatus defined by claim 1, wherein said ratio is approximately 0.5 with the air bag means in a normal operating state.

3. The apparatus defined by claim 1, wherein the air bag means comprises a single air bag of rectangular configuration.

4. Air suspension apparatus for the fifth wheel connection of a tractor and semitrailer, comprising:
   upper and lower frame sections;
   first means for mounting one of said upper and lower frame sections to one of said tractor and semitrailer;
   second means for removably connecting the other of said upper and lower frame sections to the other of said tractor and semitrailer;
   third means for operably connecting the upper and lower frame sections for relative movement;
   inflatable air bag means disposed between the upper and lower frame sections to absorb portions of forces transmitted therebetween, the air bag means having a predetermined external effective surface area and a predetermined internal volume;
   an air reservoir of predetermined internal volume;
   and an air line connecting the air bag means to the reservoir, the air line having a predetermined cross sectional area;
   the ratio of internal volume to effective surface area of said air bag means being no more than about 1 with the air bag means in its fully inflated state;
   and the ratio of effective surface area of the air bag means to the cross sectional area of the air line being at least as great as about 5,000.

5. The apparatus defined by claim 4, wherein the ratio of internal volume to effective surface area of the air bag means is on the order of 0.5 with the air bag in a normal operating state.

6. The apparatus defined by claim 4, wherein the ratio of effective surface area of the air bag means to cross sectional area of the air line is on the order of 14,000.

7. The apparatus defined by claim 4, wherein the internal volume of the reservoir approximates the internal volume of the air bag means.

8. The apparatus defined by claim 4, wherein the inflatable air bag means comprises a single air bag of rectangular configuration.

9. The apparatus defined by claim 4, wherein the third means comprises hinge means for pivotally connecting the upper and lower frame sections.

10. The apparatus defined by claim 4, wherein the reservoir comprises tubular means carried by one of said upper and lower frame sections in surrounding relation to the inflatable air bag means 11. The apparatus defined by claim 10, wherein the inflatable air bag means is rectangular in configuration and the tubular means comprises a plurality of interconnected tubular members disposed in a rectangular configuration.

12. The apparatus defined by claim 4, wherein the air line has an internal diameter of approximately 3/16 inch.

13. The apparatus defined by claim 4, wherein the first means is constructed and arranged to mount the upper frame section to the semitrailer, and a king pin is mounted on and projects downwardly from the lower frame section.

* * * * *

UNITED STATES PATENT AND TRADEMARK OFFICE
CERTIFICATE OF CORRECTION

PATENT NO. : 4,861,060

DATED : August 29, 1989

INVENTOR(S) : Leslie H. Schult and Charles J. Tekautz, Jr.

It is certified that error appears in the above-identified patent and that said Letters Patent is hereby corrected as shown below:

Col. 3, line 44
 "semitailer" should be -- semitrailer--

Col. 4, line 3-4
 "relatively" should be -- relative--

Col. 4, line 10
 after "embodied" insert -- in an air--

Col. 6, line 1
 "11k" should be --1 1/2--

Col. 8, line 54
 after "means" insert a period

Signed and Sealed this

Thirty-first Day of December, 1991

Attest:

HARRY F. MANBECK, JR.

*Attesting Officer*     *Commissioner of Patents and Trademarks*